United States Patent
Nakano et al.

(10) Patent No.: US 7,851,009 B2
(45) Date of Patent: Dec. 14, 2010

(54) PROCESS OF MAKING MEAT-LIKE FOOD PRODUCTS

(75) Inventors: Yasuyuki Nakano, Izumisano (JP); Nozomi Harada, Izumisano (JP); Hirohumi Kugitani, Izumisano (JP)

(73) Assignee: Fuji Oil Company, Limited, Osaka (JP)

( * ) Notice: Subject to any disclaimer, the term of this patent is extended or adjusted under 35 U.S.C. 154(b) by 573 days.

(21) Appl. No.: 11/471,534

(22) Filed: Jun. 21, 2006

(65) Prior Publication Data

US 2006/0233938 A1 Oct. 19, 2006

Related U.S. Application Data

(63) Continuation of application No. 10/452,640, filed on Jun. 3, 2003, now abandoned.

(51) Int. Cl.
*A23J 1/00* (2006.01)
(52) U.S. Cl. .................. 426/656; 426/574; 426/657; 426/634; 426/580; 426/448
(58) Field of Classification Search ............... 426/574, 426/656, 657, 634, 580, 448
See application file for complete search history.

(56) References Cited

U.S. PATENT DOCUMENTS

| | | | |
|---|---|---|---|
| 3,615,656 A | 10/1971 | Alden | |
| 3,662,672 A | 5/1972 | Hoer | |
| 3,713,837 A | 1/1973 | Leidy et al. | |
| 3,719,499 A * | 3/1973 | Hai et al. | 426/574 |
| 3,836,678 A | 9/1974 | Leidy et al. | |
| 3,886,298 A * | 5/1975 | Hayes et al. | 426/656 |
| 3,919,435 A | 11/1975 | Feldbrugge et al. | |
| 3,922,352 A | 11/1975 | Tewey et al. | |
| 4,031,267 A * | 6/1977 | Berry et al. | 426/656 |
| 4,061,784 A * | 12/1977 | Youngquist | 426/93 |
| 4,190,679 A | 2/1980 | Coffee et al. | |
| 4,338,340 A | 7/1982 | Morimoto et al. | |
| 4,346,652 A | 8/1982 | de Ruyter | |
| 4,361,588 A | 11/1982 | Herz | |
| 4,423,083 A | 12/1983 | Shenouda | |
| 4,559,233 A | 12/1985 | Chen et al. | |
| 4,940,590 A | 7/1990 | Williams et al. | |
| 5,300,312 A | 4/1994 | Lusas et al. | |
| 5,928,690 A | 7/1999 | Wiebe, Jr. | |
| 6,607,777 B1 | 8/2003 | Walsh et al. | |
| 6,692,788 B1 | 2/2004 | Mottram et al. | |
| 7,320,583 B2 * | 1/2008 | Bortone et al. | 425/155 |

* cited by examiner

*Primary Examiner*—Anthony Weier
(74) *Attorney, Agent, or Firm*—Wenderoth, Lind & Ponack, L.L.P.

(57) ABSTRACT

The present invention provides a meat-like food material having a favorable flavor and a meat-like mouthfeel by heating and pressurizing ingredients including a vegetable protein ingredient, a milk whey protein ingredient and water as the main ingredients with an extruder to obtain a swollen product, and a fried meat-like food product by reconstituting said meat-like food material with a seasoning liquid followed by frying, as well as a glazed fried meat-like food product by coating said fried meat-like food product with a glaze.

1 Claim, No Drawings

PROCESS OF MAKING MEAT-LIKE FOOD PRODUCTS

This application is a continuation application of Ser. No. 10/452,640, filed Jun. 3, 2003 now abandoned.

BACKGROUND OF THE INVENTION

The present invention relates to a meat-like food material having a favorable flavor and a meat-like mouthfeel made from a vegetable protein ingredient and a milk whey protein ingredient and to a meat-like food product (such as a fried food product) produced employing such a material.

JP-A-62-14747 discloses "a method of producing a food product having a meat-like texture" employing a milk whey ingredient, and the method comprised adding water to a milk whey protein concentrate (WPC) up to a water content of 30 to 50%, heating and pressurizing the WPC with an extruder followed by extrusion through a die whose structure prevents a product from swelling to produce a meat-like product.

However, a texturized product obtained by such method has an intense milk odor which is not favorable in a meat-like food material. The mouthfeel resembles fish meat rather than livestock meat. In addition, the wet texturized product is hard to be seasoned upon a secondary seasoning process.

On the other hand, a method of producing a texturized vegetable protein food product with a vegetable protein ingredient as the main ingredient, without a milk whey protein ingredient, has widely been known for a long time.

Recently, patent applications (JP-A-6-98685 and JP-A-6-98686) relating to a meat-like protein food product with a better flavor and a better mouthfeel which was obtained by an improvement of such method were filed.

These patent applications comprises that a composition comprising powdery vegetable protein ingredient (soybean protein or wheat protein) as the main ingredient is combined with a microparticulate silica gel clathrate with seasoning ingredients in an amount of 0.5 to 6.0% by weight based on the main ingredient (or combined with a cyclodextrin clathrate with seasoning ingredients in an amount of 1/5 to 1/100 parts by weight of the main ingredient), and the mixture is kneaded and melted with adding water up to an amount of 1/10 to 1/1 parts by weight of the main ingredient under a high temperature and a high pressure, such as 100 to 200° C. and 5 to 100 kg/cm$^2$, with an extruder and then is extruded via a cooling die to obtain a meat-like protein-containing texturized product.

A texturized product obtained by such method resembles meat in fiber, and is improved when compared with a case of no microparticulate silica gel or cyclodextrin clathrate. However, the texturized product still has a flavor specific to a vegetable protein ingredient, and thereby is not suitable for use as a food material. The texturized product also has a rough swallowing feel.

SUMMARY OF THE INVENTION

Objectives of the present invention are to produce a meat-like food material, which has a meat-like mouthfeel (fibrous, readily bitten off, and smoothly swallowed) and a favorable flavor (a reduced vegetable protein ingredient-derived odor and a reduced milk-derived odor) and which can readily be seasoned, and to produce a juicy meat-like food product (such as fried foods, glazed fried foods, seasoned foods, and the like) by employing such a meat-like food material.

The present inventors made an effort to accomplish the objectives described above and finally discovered that the objectives can be accomplished by using a combination of a vegetable protein ingredient and a milk whey protein ingredient, which have not been utilized effectively in spite of their highly nutritional properties.

Thus, the present invention provides a meat-like food material produced by heating and pressurizing ingredients including a vegetable protein ingredient, a milk whey protein ingredient and water as the main ingredients with an extruder to obtain a swollen product. Furthermore, the present invention provides a meat-like food product produced by reconstituting said meat-like food material with a seasoning liquid followed by cooking.

The meat-like food material can be reconstituted with a seasoning liquid and then fried to provide a fried meat-like food product.

The meat-like food material can be reconstituted with a seasoning liquid, fried and then coated with a glaze to provide a glazed fried meat-like food product.

The meat-like food product may contain 2% to 25% by weight of saccharides.

The meat-like food product may contain 2% to 25% by weight of emulsified oils and fats.

The meat-like food product may contain 2% to 20% by weight as a dry solid content of egg white.

DETAILED DESCRIPTION OF THE PREFERRED EMBODIMENTS

A meat-like food material according to the present invention is detailed below.

The meat-like food material can be produced by a method comprising heating and pressurizing ingredients including a vegetable protein ingredient, a milk whey protein ingredient and water as the main ingredients with an extruder to obtain a swollen product.

Ingredients employed in the present invention are discussed below.

Vegetable protein ingredients employed in the present invention include proteins derived from oil-producing seeds such as soybeans, peas, rapeseeds, cottonseeds, peanuts, sesames, safflowers, sunflowers, corns, safflowers, coconuts and the like; proteins derived from cereal seeds such as rice, barley and wheat and the like; proteins extracted or processed from the above-mentioned proteins, rice glutelin, barley prolamine, wheat prolamine, wheat gluten, soybean globulin, soybean albumin, peanut albumin and the like; and proteins obtained by subjecting the above-mentioned proteins to heat, acid, alkali or enzyme treatment, or a mixture thereof.

In view of nutritional properties, commercial availability and cost, proteins derived from oil-producing seeds are preferably employed. More preferably soybean protein is employed. The soybean protein may be selected from the group consisting of whole fat soybean, defatted soybean, soybean milk powder, isolated soybean proteins and the like, and a mixture thereof.

A milk whey protein ingredient may be milk whey protein obtained during a process for producing cheese from milk. Preferably, a milk whey protein ingredient is selected from the group consisting of a milk whey protein concentrate (WPC), a milk whey protein isolate (WPI) and the like, and a mixture thereof.

In the present invention, the ratio of a vegetable protein ingredient to a milk whey protein ingredient is suitably 95/5 to 45/55 (weight ratio as dried solid), preferably 85/15 to 55/45 (weight ratio as dried solid), more preferably 75/25 to 65/35 (weight ratio as dried solid).

If the ratio of a vegetable protein ingredient to a milk whey protein ingredient is larger than the range of 95/5 to 45/55, a marked vegetable protein odor is caused in the final product.

If the ratio of a vegetable protein ingredient to a milk whey protein ingredient is smaller than the range of 95/5 to 45/55, an intense milk odor is caused in the final product and it is also difficult to obtain a stable swollen texturized product.

Water employed in the present invention is discussed below.

In the present invention, the dough made from ingredients and water which were fed into an extruder has a water content in the range of 20 to 50% by weight, preferably in 25 to 45% by weight, more preferably 30 to 40% by weight.

Within such range of the water content, the desired swollen meat-like food material can be obtained.

While the main ingredients are discussed above, protein ingredients other than the vegetable protein ingredient and the milk whey protein ingredient or ingredients other than the protein ingredients may also be employed as the need arises.

Such protein ingredients other than the vegetable protein ingredient and the milk whey protein ingredient include proteins derived from animals and microorganisms, and mixtures thereof.

When a total content of vegetable protein and animal protein in the dry solid weight of all ingredients is not less than 50% by weight, a texturized protein product with a meat-like-texture can be obtained.

Such ingredients other than the protein ingredients include oils and fats. The oils and fats are not limited particularly as long as they are edible, and may be selected from the group consisting of animal, vegetable and microorganism-derived oils and fats and mixtures thereof.

For example, vegetable-derived oils and fats include soybean oil, olive oil, rapeseed oil, peanut oil, sesame oil, sunflower oil, palm oil, corn oil, palm oil, cocoa butter, cottonseed oil, rice bran oil, onion oil and the like. Animal-derived oils and fats include beef tallow, lard, fish oil, whale oil and the like. The above-mentioned oils and fats may be unpurified or processed such as fractionated, hydrogenated or ester-exchanged, and may be also butter, shortening, margarine, cream, etc., or a mixture thereof. Such oils and fats may contain, if necessary, emulsifiers such as lecithin, vitamins, taste modifiers, flavors and the like.

An extruder employed in the present invention is discussed below.

An extruder employed in the present invention may be any known extruder. Although a single-screw extruder may be employed for the purpose of ensuring the effect, an extruder with at least twin-screw is preferably employed for the purpose of obtaining a product having a strong fibrous structure and a chewy texture because it can knead powerfully to promote formation of a texturized product.

An extruder may be any extruder having an inlet for ingredients, a means of passing ingredients through a barrel by an action of a screw, means of mixing, compressing and heating ingredients along the barrel, and a die fitted with the tip of the barrel. The barrel may or may not have a jacket, which may or may not be used for heating or cooling.

The extruder may be equipped with a forward screw with the function of passing ingredients and may also be further equipped with a cut screw, reverse cut screw, kneading screw, reverse kneading screw or paddle screw with the kneading function, and if necessary, may be further equipped with a reverse screw, spacer, steam lock and the like.

Conditions of texturization of a meat-like food material may be established experimentally on the basis of the desired meat-like food material. Typically, the tip barrel temperature is 140° C. to 190° C., preferably 145 to 185° C., more preferably 150° C. to 180° C., and the pressure for extrusion is 0 to 50 kg/cm$^2$. The tip barrel temperature below 140° C. is not preferable since it leads to an insufficient melting of ingredients, resulting in an insufficient texturization and gives a product without a meat-like mouthfeel. The temperature exceeding 190° C. is also not preferable since it burns a product and the burning smell lowers the value of the product as a commercial product.

A die used for molding of the meat-like food material may be any known die such as a die for extruding in the direction of a screw (i.e., face die) or a die for extruding toward the barrel circumference (i.e., peripheral die).

A meat-like food material thus obtained may be cut into pieces of an appropriate size using a cutter or pulverizer.

The meat-like food material can be used as being dried, and in such a case the drying may be accomplished by a drum drying, fluidized bed drying, rack drying, freeze drying and the like.

According to the present invention, a swollen meat-like food material can be obtained by simultaneous use of (a combination of) a vegetable protein ingredient and a milk whey protein ingredient. The swelling can not be achieved by using only a milk whey protein ingredient. The swelling is sufficient when the cross sectional area of a product becomes 1.5 times the area of a die.

A meat-like food material thus obtained is a swollen texturized product which has a protein content in 50% by weight or more based on the dry solid weight, which can absorb water 1 or more times the weight of the product (when 10 parts by weight of water was added to reconstitute 1 part by weight of the product at 80° C. for 30 minute followed by draining water over a mesh for 1 minute), and which has a water content in 20% by weight or less and wherein the fibers are orientated.

The meat-like food material of the present invention has a close texture in spite of its swollen form. Therefore, the meat-like food material of the present invention can be reconstituted with a seasoning liquid to obtain a seasoned meat analog which can be handled similarly to real seasoned meat. For example, when the seasoned meat analog is fried, it has a fried meat-like mouthfeel. When the fried seasoned meat analog is further coated with a glaze, it has a juicier meat-like mouthfeel.

The following description is made with regard to a meat-like food product which was obtained by reconstituting the meat-like food material with a seasoning liquid followed by cooking.

Any type of seasonings can be employed to prepare the seasoning liquid. For example, a soy sauce, liquor, salt, spice, extract, saccharide, oil and fat, egg and the like can be contained in the seasoning liquid.

The seasoning liquid basically contains a soy sauce, Japanese sake, salt, spices, chicken extract, warm water and the like.

It is preferred to add saccharides in the range of 2% to 25% by weight, preferably 5 to 20% by weight based on the meat-like food product into the seasoning liquid. By the addition of saccharides within such range, the meat-like food product obtained becomes juicier. If the amount of saccharides is above the range of 2% to 25% by weight, the meat-like food product obtained is too sweet and not preferable.

The saccharides employed are not limited particularly. For example, a liquid saccharide (sucrose and the like) may be used. For example, the meat-like food product obtained is moderate juicy when a saccharide is present in an amount of 2.3% by weight based on the meat-like food product. The meat-like food product obtained is much juicier and has a mouthfeel similar to that of chicken meat when a saccharide is present in an amount of 7.5% by weight based on the meat-like food product. However, the presence of a saccharide in an amount of 30% by weight or more based on the meat-like food product is not preferable since it causes a too intense sweetness.

It is also preferred to add emulsified oils and fats in the range of 2% to 25% by weight, preferably 5 to 20% by weight based on the meat-like food product into the seasoning liquid.

By the addition of emulsified oils and fats within such range, the meat-like food product obtained becomes juicier advantageously. If the amount of the emulsified oils and fats is above the range of 2% to 25%, the meat-like food product obtained is greasy and not preferable.

Such emulsified oils and fats include, but not limited to, oils and fats described above (oils and fats containing an emulsifier such as lecithin, butter, shortening, margarine, cream and the like). For example, emulsified-containing oils and fats may be used. For example, the meat-like food product obtained has a moderate juicy mouthfeel when an emulsified oil or fat is present in an amount of 2.3% by weight based on the meat-like food product. The meat-like food product obtained is juicier and has a mouthfeel similar to that of chicken meat, when a emulsified oil or fat is present in an amount of 7.5% by weight based on the meat-like food product. However, the presence of an emulsified oil or fat in amount of 30% by weight or more based on the meat-like food product is not preferable since it causes a greasy taste.

It is also preferred to add egg white in the range of 2% to 20% by weight, preferably 5 to 15% by weight, as a dry solid, based on the meat-like food product into the seasoning liquid.

By the addition of egg white within such range, the meat-like food product obtained becomes bitten off readily and similar to chicken meat in a mouthfeel. If the amount of the egg white is above the range of 2% to 20% by weight, the meat-like food product obtained has an intense egg white taste and is not preferable.

For example, the meat-like food product obtained can be bitten off a little readily when egg white is present in an amount of 2.3% by weight, as a dry solid, based on the meat-like food product. The meat-like food product obtained can be bitten off readily which is similar to that of chicken meat, when egg white is present in an amount of 7.5% by weight based on the meat-like food product. However, the presence of egg white in an amount of 22.5% by weight or more based on the meat-like food product is not preferable since it causes the egg white flavor. The egg white may be a dried egg white.

A meat-like food product obtained by reconstituting the meat-like food material of the present invention with water or the seasoning liquid as described above can be handled similarly to ordinary meat, and can be eaten deliciously after being cooked, for example, broiled, steamed or fried.

The following description is with regard to a fried food product obtained by frying the meat-like food material obtained as described above as well as a method for producing the same.

Prior to frying, the meat-like food material may be dusted for example with flour for french-frying.

Conditions of frying may vary depending on the size of the desired meat-like food product or the amount, if any, of the flour for french-frying. For example, when the size of the meat-like food product is about the size of ordinary commercial french-fried chicken (about 30×30×30 mm), the frying conditions may be at 160 to 180° C. for 1 to 3 minutes.

It is also possible that the meat-like food material is dipped into a liquid egg, dusted with potato starch powder and then fried at 160 to 180° C. for 1 to 3 minutes to obtain a fried food product.

After frying, the fried meat-like food product may be coated with a glaze to obtain a more satisfactory appearance of the finished form as a food product. Such a glaze is not limited particularly.

EXAMPLES

The present invention is further described in the following EXAMPLES which are only illustrative and not related directly to the connotation and the denotation of the spirit of the present invention.

Example 1

According to the ratios shown in Table 2, defatted soybean powder (FUJI SEIYU, 52% Protein, 6% Water, 0.5% Fat) was mixed homogeneously with a milk whey protein concentrate (WPC) "CalPro" WPC8002 (CALPRO in United States, 79% Protein, 4% Water, 5% Fat) in a powder mixer and fed together with water as ingredients into an extruder (KOWA KOGYO, Model KEI45-25). Conditions of operating the extruder were as shown in Table 1.

A texturized product extruded from the extruder was cut into pieces each of which are about 30 mm in length, and dried in a drier until the water content became 10%. The dried texturized product was reconstituted with 10 times amount of warm water at 80° C. for 30 minutes, drained water off for 1 minute, and examined for its water absorption rate (ratio between the weights before and after hydration). The qualities of the hydrated texturized product (shape, flavor, mouthfeel) were evaluated. The flavor and mouthfeel were assessed organoleptically by 10 experienced professional panelists while scoring them with the scale up to 10 points, and the evaluation was made on the basis of the mean score. Difficulty in sensing a vegetable protein odor or milk odor was regarded to be point 10. The mouthfeel similar to that of grilled chicken meat was regarded to be point 10.

TABLE 1

| Extruder operating conditions | |
| --- | --- |
| Input | 20 kg/hr |
| Added Water | 8 to 9 L/hr |
| Screw speed | 200 r.p.m. |
| Early barrel temperature | 90 to 120° C. |
| Late barrel temperature | 140 to 180° C. |

TABLE 2

Effect of combination ratio between defatted soybean and WPC on shape, flavor and mouthfeel

| | Sample No. | | | | | | | |
|---|---|---|---|---|---|---|---|---|
| | 1 | 2 | 3 | 4 | 5 | 6 | 7 | 8 |
| (Combination Ratio) | | | | | | | | |
| Defatted soybean | 100 | 90 | 80 | 70 | 60 | 50 | 40 | 0 |
| WPC | 0 | 10 | 20 | 30 | 40 | 50 | 60 | 100 |
| Shape | Meat chunk | Meat chunk | Meat chunk | Meat chunk | Small meat chunk | Small meat piece | Very small meat piece | Very small meat piece |
| (Flavor) | | | | | | | | |
| Vegetable protein odor | 4 | 7 | 10 | 10 | 10 | 10 | 10 | 10 |
| Milk odor | 10 | 10 | 10 | 10 | 7 | 4 | 3 | 1 |
| Mean score of flavor | 7 | 8.5 | 10 | 10 | 8.5 | 7 | 6.5 | 5.5 |
| (mouthfeel) | | | | | | | | |
| Fibrous feel | 4 | 7 | 10 | 10 | 10 | 10 | 10 | 1 |
| Cut upon bite | 10 | 10 | 10 | 10 | 10 | 7 | 4 | 1 |
| Swallowing smoothness | 4 | 4 | 7 | 10 | 10 | 7 | 4 | 1 |
| Juiciness | 5 | 5 | 5 | 4 | 4 | 4 | 4 | 1 |
| Mean score of mouthfeel | 5.8 | 6.5 | 8 | 8.5 | 8.5 | 7 | 5.5 | 1 |
| Water absorption rate | 3.0 | 2.8 | 2.5 | 2.3 | 2.2 | 2.1 | 1.8 | 1.5 |

The combination ratio is on the basis of dried solid weight.
Evaluation of shape (as meat-like food product): "Meat chunk" = a meat chunk like a french-fried chicken (about 30 mm × 30 mm × 30 mm), "Small meat chunk" = a small meat chunk like a grilled chicken (about 15 mm × 15 mm × 15 mm), "Small meat piece" = a small meat piece like a sliced garlic (about 10 mm × 5 mm × 3 mm), "Very small meat piece" = a very small meat piece like a dry bread crumb (about 3 mm × 3 mm × 3 mm).
Flavor evaluation: [1] Vegetable protein odor = an odor derived from vegetable protein ingredient, [2] Milk odor = an odor derived from milk.

As shown in Table 2, Sample No. 4 was the best meat-like food material in the shape, flavor and mouthfeel. The present invention succeeded in suppression of the vegetable protein odor of a particulate vegetable protein ingredient in a protein-containing texturized product with a meat-like mouthfeel, which could not be achieved by a conventional method. The fact that an increased amount of WPC resulted in the smaller-sized shape of a product may be due to labile texturization of a product which can be flushed readily. The shape may be stabilized by using a die capable of suppressing swelling of a product such as a cooling die, but the mouthfeel of the product becomes such hard as can not be bitten off easily. In addition, a WPC content exceeding 60% causes an intense milk odor which is not favorable in a meat-like food material. The meat-like mouthfeel which could not be obtained only with a vegetable protein ingredient because a sponge-like feel remained in a product, could be obtained successfully by means of using a vegetable protein ingredient and a milk whey ingredient simultaneously.

Example 2

A 30% WPC-containing meat-like food material obtained in the test described above was compared with chicken leg meat in a french-frying experiment. The meat-like food material was reconstituted with water or a seasoning liquid to obtain a meat-like food product. (After reconstituting 1 part by weight of the material with 5 parts by weight of seasoning liquid at 60° C. for 3 hours followed by draining water over a mesh, the meat-like food material was adjusted to retain 3 parts by weight of water or seasoning liquid.) The seasoning liquid contained 4 parts of soy sauce, 2 parts of sake, 1 part of salt, 1 part of spice, 2 parts of chicken extract and 90 parts of warm water.

A french-frying flour "SHOYUAJI S-475" (RIKEN VITA-MIN) was combined with water at a ratio of 1:1, and coated onto the meat-like food product. The meat-like food product was then french-fried in squeezed soybean white oil (FUJI SEIYU) at 175° C. for 1 minutes and 30 seconds.

The texture and the flavor were assessed organoleptically by 10 experienced professional panelists, and the evaluation was made on the basis of the mean score. The mouthfeel similar to that of a french-fried chicken meat was regarded to be point 10. The flavor was scored 10 when it was difficult to sense a vegetable protein odor or milk odor. The fried chicken taste was scored 10 when the taste equivalent to real french-fried chicken was noted.

TABLE 3

Comparison in french-fried foods

| | Sample No. | | |
|---|---|---|---|
| | 9 | 10 | 11 |
| Combination Ratio | | | |
| Chicken leg meat | 100 | — | — |
| Sample No. 4 | — | 25 | 25 |
| Water | — | 75 | — |
| Seasoning liquid | — | — | 75 |
| Mouthfeel | | | |
| Fibrous feel | 10 | 9 | 9 |
| Cut upon bite | 10 | 7 | 7 |
| Swallowing smoothness | 9 | 7 | 7 |
| Juiciness | 9 | 3 | 4 |
| Mean score of mouthfeel | 9.5 | 6.5 | 6.8 |
| Flavor | | | |
| Vegetable protein odor/milk odor | 10 | 10 | 10 |
| French-fried chicken taste | 10 | 5 | 8 |
| Mean score of flavor | 10.0 | 7.5 | 9.0 |

Based on the results of the evaluation shown in Table 3, Sample No. 10 (reconstituted with water) had a poor french-fried chicken-like taste. Sample No. 11 (reconstituted with a seasoning liquid) retained seasonings successfully and exhibited a taste similar to the french-fried chicken taste, but had an insufficient juiciness which should be compensated.

Example 3

Based on the results of EXAMPLE 2, an effect of a saccharide supplementation in a meat-like food product using the 30% WPC-containing meat-like food material was examined. A sucrose-based liquid sugar was employed as the saccharide. The production, formulation and evaluation were conducted similarly to EXAMPLE 2.

TABLE 4

Comparison of french-fried sugar-supplemented meat-like food products

| | Sample No. | | | | |
|---|---|---|---|---|---|
| | 12 | 13 | 14 | 15 | 16 |
| Combination Ratio | | | | | |
| Sample No. 4 | 25 | 25 | 25 | 25 | 25 |
| Seasoning liquid | 72.7 | 67.5 | 60.0 | 52.5 | 45.0 |
| Sugar | 2.3 | 7.5 | 15.0 | 22.5 | 30.0 |
| Mouthfeel | | | | | |
| Fibrous feel | 9 | 9 | 9 | 9 | 9 |
| Cut upon bite | 7 | 7 | 7 | 7 | 7 |
| Swallowing smoothness | 7 | 7 | 7 | 7 | 7 |
| Juiciness | 5 | 6 | 6 | 6 | 6 |
| Mean score of mouthfeel | 7.0 | 7.3 | 7.3 | 7.3 | 7.3 |
| Flavor | | | | | |
| Vegetable protein odor, Milk odor | 10 | 10 | 10 | 10 | 10 |
| French-Fried Chicken taste | 8 | 8 | 8 | 7 | 5 (Sweet) |
| Mean score of flavor | 9.0 | 9.0 | 9.0 | 8.5 | 7.5 |

Based on the results of the evaluation shown in Table 4, the meat-like food product was moderate juicy when the sugar was present in an amount of 2.3% by weight in the product. The meat-like food product was juicier when the sugar was present in an amount of 7.5% by weight in the product, which gave a mouthfeel similar to that of chicken meat. However, the presence of sugar in an amount of 30% by weight or more in the meat-like food product is not preferable since it caused intense sweetness.

Based on the mean scores of the mouthfeel and the flavor, more preferred sugar contents in a meat-like food product were considered to be 7.5% and 15%.

Example 4

Based on the results of EXAMPLE 2, an effect of a fat supplementation in a meat-like food product using the 30% WPC-containing meat-like food material was examined. An emulsifier-containing fat "UNISHORT-EF" (FUJI SEIYU) was employed as the fat. The production, formulation and evaluation were conducted similarly to EXAMPLE 2.

TABLE 5

Comparison of french-fried fat-supplemented meat-like food products

| | Sample No. | | | | |
|---|---|---|---|---|---|
| | 17 | 18 | 19 | 20 | 21 |
| Combination Ratio | | | | | |
| Sample No. 4 | 25 | 25 | 25 | 25 | 25 |
| Seasoning liquid | 72.7 | 67.5 | 60.0 | 52.5 | 45.0 |
| Fat | 2.3 | 7.5 | 15.0 | 22.5 | 30.0 |
| Mouthfeel | | | | | |
| Fibrous feel | 9 | 9 | 9 | 9 | 9 |
| Cut upon bite | 7 | 7 | 7 | 7 | 7 |
| Swallowing smoothness | 7 | 8 | 8 | 9 | 9 |
| Juiciness | 6 | 7 | 7 | 8 | 8 |
| Mean score of mouthfeel | 7.3 | 7.8 | 7.8 | 8.3 | 8.3 |
| Flavor | | | | | |
| Vegetable protein odor, Milk odor | 10 | 10 | 10 | 10 | 10 |
| French-Fried Chicken taste | 8 | 8 | 8 | 7 | 5 (Greasy) |
| Mean score of flavor | 9.0 | 9.0 | 9.0 | 8.5 | 7.5 |

Based on the results of the evaluation shown in Table 5, the meat-like food product was moderate juicy when the fat was present in an amount of 2.3% by weight in the product. The meat-like food product was juicier when the fat was in an amount of 7.5% by weight in the product, which gave a mouthfeel similar to that of chicken meat. The swallowing smoothness became satisfactory at 7.5%, and was further improved at 22.5%. However, the presence of the fat in an amount of 30% by weight or more in the meat-like food product was not preferable since it caused greasy flavor. Thus, based on the mean scores of the mouthfeel and the flavor, more preferred fat contents in a meat-like food product were considered to be 7.5% and 15%.

Example 5

Based on the results of EXAMPLE 2, an effect of an egg white supplementation in a meat-like food product using the 30% WPC-containing meat-like food material was examined. The egg white employed here was powdery. The production, formulation and evaluation were conducted similarly to EXAMPLE 2.

TABLE 6

Comparison of egg white-supplemented french-fried meat-like food products

| | Sample No. | | | |
|---|---|---|---|---|
| | 22 | 23 | 24 | 25 |
| Combination Ratio | | | | |
| Sample No. 4 | 25 | 25 | 25 | 25 |
| Seasoning liquid | 72.7 | 67.5 | 60.0 | 52.5 |
| Dried egg white | 2.3 | 7.5 | 15.0 | 22.5 |
| Mouthfeel | | | | |
| Fibrous feel | 9 | 9 | 9 | 9 |
| Cut upon bite | 8 | 9 | 9 | 9 |
| Swallowing smoothness | 7 | 7 | 7 | 7 |
| Juiciness | 4 | 4 | 4 | 4 |
| Mean score of mouthfeel | 7.0 | 7.3 | 7.3 | 7.3 |
| Flavor | | | | |
| Vegetable protein odor, Milk odor | 10 | 10 | 10 | 10 |
| French-Fried Chicken taste | 8 | 8 | 7 | 5 (Egg albumen odor) |
| Mean score of flavor | 9.0 | 9.0 | 8.5 | 7.5 |

Based on the results of the evaluation shown in Table 6, the meat-like food product was a little hard in the texture when the egg white was present in an amount of 2.3% by weight in the product. The meat-like food product was harder in the texture when the egg white was present in an amount of 7.5% by weight in the product, which gave a mouthfeel similar to that of chicken meat. However, the presence of the egg white in an amount of 22.5% by weight or more in the meat-like food product was not preferable since it caused an egg white flavor in the product. Thus, based on the mean scores of the mouthfeel and the flavor, preferred egg white contents in a meat-like food product were considered to be 7.5% and 15%.

Example 6

Based on the results of EXAMPLES 2 to 5, an effect of a supplementation of a combination of sugar, fat and egg white in a meat-like food product using the 30% WPC-containing meat-like food material was examined and an effect of glaze coating was also examined. The glaze contained 40 parts of water, 23 parts of tomato ketchup, 10 parts of vinegar, 9 parts of sugar, 5 parts of potato starch powder, 4 parts of squeezed soybean white oil, 4 parts of chili sauce, 4 parts of thick soy sauce and 1 part of chicken consommé (every ingredient was commercially available).

TABLE 7

Comparison of (glaze-coated or non-coated) sugar, fat and egg white-supplemented french-fried meat-like food products

| | Sample No. | | |
|---|---|---|---|
| | 26 | 27 | 28 |
| Combination Ratio | | | |
| Chicken leg meat | 100 | 0 | 0 |
| Sample No. 4 | 0 | 25 | 25 |
| Seasoning liquid | 0 | 52.5 | 52.5 |
| Sugar | 0 | 7.5 | 7.5 |
| Fat | 0 | 7.5 | 7.5 |
| Dried egg white | 0 | 7.5 | 7.5 |
| Glaze | Present | Absent | Present |
| Mouthfeel | | | |
| Fibrous feel | 10 | 9 | 9 |
| Cut upon bite | 10 | 9 | 9 |
| Swallowing smoothness | 10 | 8 | 9 |
| Juiciness | 10 | 8 | 9 |
| Mean score of mouthfeel | 10.0 | 8.5 | 9.0 |
| Flavor | | | |
| Vegetable protein odor, Milk odor | 10 | 10 | 10 |
| French-Fried Chicken taste | 10 | 8 | 9 |
| Mean score of flavor | 10.0 | 9.0 | 9.5 |

Based on the results of the evaluation shown in Table 7, the mouthfeel became more similar to chicken meat in terms of all of the fibrous feel, cut upon bite, swallowing smoothness and juiciness when the sugar, fat and egg white were present in each amount of 7.5% by weight in the meat-like food product. As a result of the glaze coating, the appearance of the finished form became more satisfactory and similar to that of chicken meat.

According to the present invention, a meat-like food material which has a mouthfeel similar to that of meat (fibrous, readily bitten off, and smoothly swallowed), a favorable flavor (a reduced vegetable protein ingredient-derived odor and a reduced milk-derived odor) and which can readily be seasoned can be produced.

In addition, a juicier meat-like food product (such as fried foods, glazed fried foods, seasoned foods, and the like) can also be produced by employing said meat-like food material.

Such an advantage is due to a combination of a vegetable protein ingredient and a milk whey ingredient. A conventional meat-like food product made from a vegetable protein ingredient as the main ingredient had a swollen spongy texture and hard to be swallowed. However, the meat-like food material of the present invention, which is produced by using a vegetable protein ingredient in combination with a milk whey protein ingredient, have a meat-like close and fibrous texture and can be bitten off readily and be swallowed smoothly. In addition, a product obtained by using only vegetable protein ingredient retains a vegetable protein odor, while a product obtained by using only a milk whey protein ingredient retains a milk odor. Nevertheless, combination use of the both results in suppression of the both odors and allows the product obtained to be seasoned easily, thus providing a favorably flavored meat-like food material. By reconstituting said meat-like food material with any of various seasoning liquids, a seasoned meat analog can be obtained and handled similarly to a real seasoned meat. Such a seasoned meat analog can be cooked to become a meat-like food product.

Moreover, the present invention proposes a way of utilizing a vegetable protein ingredient and a milk whey protein ingredient which have not been utilized effectively in spite of their highly nutritional properties in production of a satisfactorily finished meat-like food product.

What is claimed is:

1. A process for producing a meat-like food material which comprises:

heating and pressurizing ingredients including a soy protein ingredient, a milk whey protein ingredient selected from the group consisting of a milk whey protein concentrate 80 (WPC80), a milk whey protein isolate (WPI) and a mixture thereof, and water, and containing 20 to 50% by weight of water, with a twin-screw extruder at a tip barrel temperature of 140 to 190° C. to obtain a swollen product, and drying the swollen product, wherein the ratio of the soy protein ingredient to the milk whey protein ingredient is 75/25 to 65/35 (as dry solid weight ratio).

* * * * *